United States Patent [19]

Grasso

[11] 4,267,659
[45] May 19, 1981

[54] SINKER RELEASING APPARATUS

[76] Inventor: Roy Grasso, 5915 W. Wallbrook, San Jose, Calif. 95129

[21] Appl. No.: 93,025

[22] Filed: Nov. 9, 1979

[51] Int. Cl.³ .............................................. A01K 97/00
[52] U.S. Cl. ................................................... 43/43.12
[58] Field of Search ................... 43/43.12, 42.04, 43.1

[56] References Cited

U.S. PATENT DOCUMENTS

| | | | |
|---|---|---|---|
| 2,359,588 | 10/1944 | Shea | 43/43.12 |
| 2,392,335 | 1/1946 | Morrill | 43/43.12 |
| 2,830,400 | 4/1958 | Perry | 43/43.12 |
| 2,932,115 | 4/1960 | Dunn | 43/43.12 |
| 2,994,622 | 8/1961 | Miller | 43/43.12 X |
| 3,269,051 | 8/1966 | Saunders | 43/43.12 |
| 3,318,036 | 5/1967 | McGuire | 43/43.12 |
| 3,391,482 | 7/1968 | Benoit | 43/43.12 |

Primary Examiner—Nicholas P. Godici
Attorney, Agent, or Firm—Phillips, Moore, Weissenberger, Lempio & Majestic

[57] ABSTRACT

An improvement in a fishing apparatus is provided which has a body and a sinker releasably held thereto. The improved apparatus includes a notch in the body, and a release mechanism mounted on the body. A portion of the release mechanism is adapted for pivotal movement within the notch. The sinker has two protruding hook members. One hook member is held within the notch by the release mechanism portion. The other hook member is pivotally mounted on the body by a slot thereof. The improved apparatus sensitively and accurately releases the sinker when a fish has struck, and such release is readily sensed by a fisherman.

8 Claims, 3 Drawing Figures

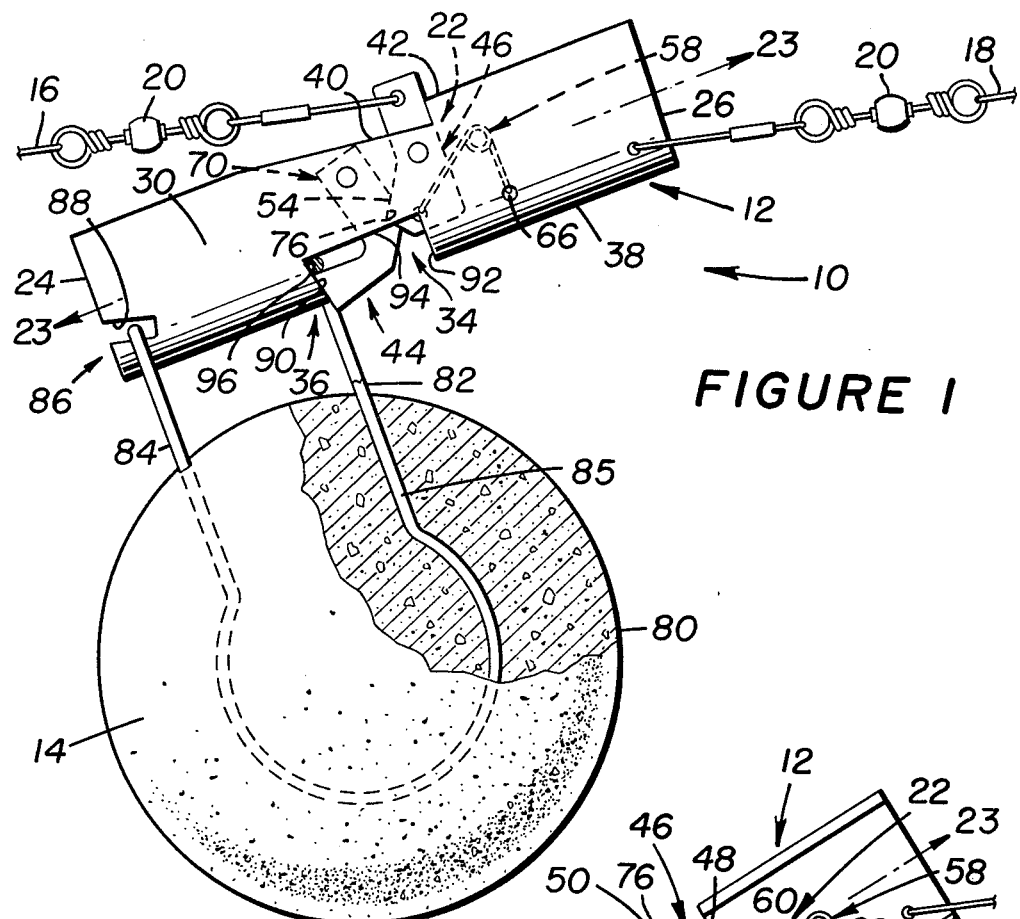
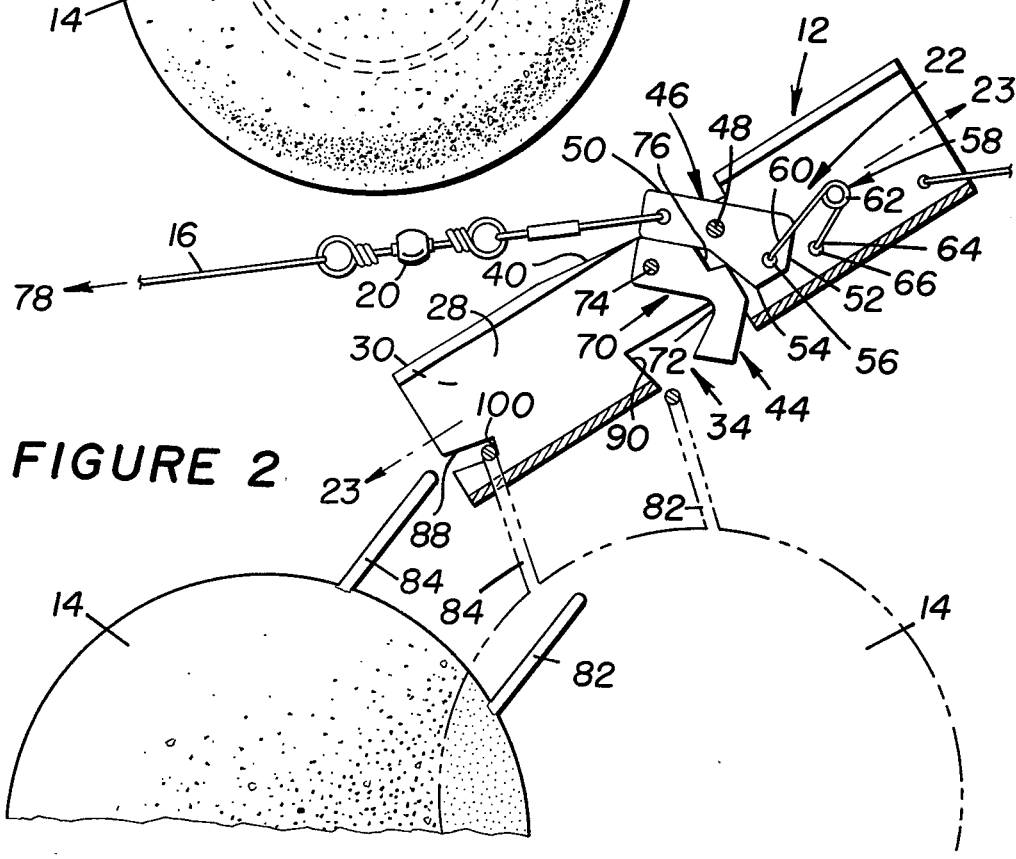

SINKER RELEASING APPARATUS

DESCRIPTION

1. Technical Field

This invention generally relates to a fishing apparatus, and more particularly relates to a sinker releasing body and a sinker useful for trolling.

2. Background of the Invention

Fishing apparatus, having a sinker release to which a sinker is releasably attached, are well known and are usually disposed between a short leader line and a fishing line when one engages in trolling. Such apparatus are useful to hold the lure on the leader line well beneath the water's surface. This is particularly necessary when one is trolling in the ocean for large fish, such as salmon. When a fish of sufficient size strikes, the sinker release is actuated, via the leader line, to release the sinker. The hooked fish is thus more easily played-in for landing and netting.

Although popular, the conventional apparatus have lacked accurate or sensitive release of the sinker.

Accordingly, it is an object of the present invention to provide am improved sinker release apparatus which more accurately and sensitively releases a sinker thereof when a fish has struck.

It is another object of the present invention that the sinkers's release be readily sensed by the fisherman when a fish is well hooked and thus that the improved apparatus serves as a signal that a fish has been hooked.

SUMMARY OF THE INVENTION

In one aspect of this invention, an improved apparatus having a body and a sinker releasably held thereto comprises a first notch in the body and a release mechanism which is mounted on the body. A portion of the release mechanism is adapted for pivotal movement within the notch. Such pivotal movement is responsive to actuation of the release mechanism by a leader line attachable to the body. The release mechanism is actuated between a releasing position and holding position. The sinker has a first hook member which is receivable within the notch and held therewithin by the release mechanism portion during the holding position. The improvement further comprises a mounting means for pivotally mounting the sinker on the body and for permitting release of the sinker from the body in response to pivotal movement of the sinker.

The improved apparatus provides for sensitive and accurate release of the sinker, which release is readily sensed by the fisherman.

BRIEF DESCRIPTION OF THE DRAWINGS

FIG. 1 is a side perspective view of an embodiment of the invention which is shown in a holding position, a detail being shown partially sectioned;

FIG. 2 is a cross-sectional view similar to that of FIG. 1, but illustrating a releasing position for the embodiment.

DETAILED DESCRIPTION OF THE PREFERRED EMBODIMENT

Figure 3:
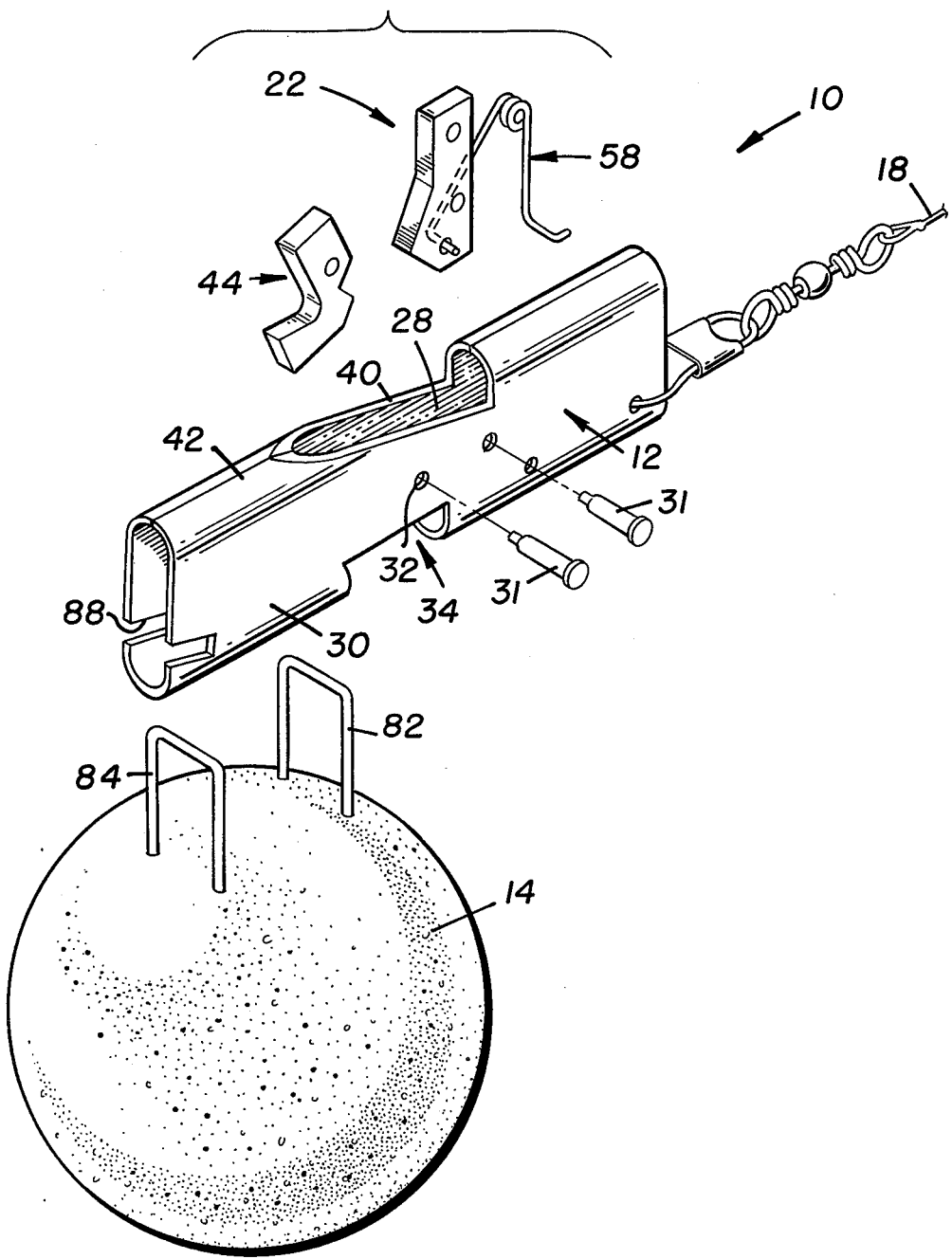
FIG. 3 is an exploded perspective view of the embodiment.

Referring to FIG. 1, a sinker releasing apparatus is denoted generally as improved apparatus embodiment 10. Apparatus 10 includes a sinker release, or body, 12 and a sinker 14. The body 12 is conventionally attachable between a leader line 16 and a fishing line 18 by means such as swivels 20. The sinker 14 is releasably held to the body 12. FIG. 1 illustrates the body 12 as holding the sinker 14, while FIG. 2 illustrates the body 12 as beginning to release the sinker 14 (the sinker illustrated in phantom) and as having released the sinker 14 (the sinker illustrated in solid).

Returning to FIG. 1, a release mechanism, generally denoted as release mechanism 22, for releasing the sinker 14 is actuated between the releasing position and the holding position by the leader line 16. The improved apparatus 10 will now be specifically described.

The body 12 longitudinally extends along an axis 23 between a one end portion 24 and another end portion 26. The fishing line 18 is connected, via one swivel 20, to the other end portion 26. As illustrated by FIG. 2, the body 12 has a substantially hollow inside 28.

Referring to FIG. 3, this hollow, longitudinally extending form for body 12 may be manufactured by various methds and formed of materials such as metals, rigid plastic or the like. For example, body 12 may be easily and simply made and components assembled therewith by stamping an initially flat piece of sturdy, relatively rigid material such as a metal, slightly furling exterior sides 30 toward opposition, and inserting various components (hereinafter further discussed) to inside 28 of body 12. Exterior sides 30 may then be fully bent into an opposed, flattened relationship with rivets 31 being insertably deformed in bores 32 of one side 30.

Referring to FIG. 1, the body 12 has a notch 34 inwardly extending at a longitudinally intermediate portion 36 of body 12. The notch 34 is cut into a lower surface 38 of body 12, while an aperture 40 is defined in an upper surface 42 of body 12. The aperture 40 is generally positioned to be opposite the notch 34.

The release mechanism 22 is mounted on the body 12, more specifically being mounted on the inside 28 of body 12, with a release mechanism portion 44 being adapted for pivotal movement within the notch 34. Elements of the release mechanism 22 will now be more fully described.

Turning to FIG. 2, the release mechanism 22 includes a first lever, or crank, 46 which is pivotally mounted by a pivot pin 48 spanning the inside 28 and fastened to both the exterior sides 30 by one of the rivets 31. The first lever 46 has one arm 50 which extends through and beyond the aperture 40, and to which is fastened one of the swivels 20 and thence the leader line 16. Thus, the leader line 16 is connected, via one swivel 20, adjacent the intermediate portion 36 of body 12. Another arm 52 of the first lever 46 has an outwardly projecting surface 54 therefrom and has a small hole 56 therethrough.

A biasing means, or spring 58, is within the inside 28 of body 12. More particularly, the spring 58 has an end 60 which is fixed in hole 56, has a coil 62, and has another end 64 extending from inside 28 to be attached to the side 30 of body 12. This latter attachment may be simply poking the end 64 through a small hole 66 passing from inside 28 to one side 30, and hooking end 64 along the one side 30. The functioning of spring 58 will be better understood after the following description of another component for the release mechanism 22.

Release mechanism 22 also includes a second lever 70 which is pivotally mounted in a manner similar to that described for the first lever 46, and which positions the second lever 70 to be closely adjacent the first lever 46. Second lever 70 has an "L" shaped arm 72 which carries the previously mentioned portion 44 thereon. It will be recalled that portion 44 is adapted for pivotal movement within the notch 34. However, the portion 44 is held against such pivotal movement (during the holding position, illustrated by FIG. 1) by the first lever 46 and spring 58 as follows.

Referring to FIG. 1, there is defined on the arm 72, and spaced between the portion 44 and a pivot point 74 for second lever 70, a niche 76. The spring 58 urges the first lever 46 into engagement with the second lever 70 to hold the second lver 70 against pivotal movement within the nnotch 34; more particularly, the outwardly projecting surface 54 of the first lever 46 fits into, or abuts, the niche 76.

Turning to FIG. 2, it may be seen that when a force, such as a fish which has struck and pulls on the leader line 16 in the direction indicated by arrow 78, is of sufficient magnitude to overcome the strength of spring 58, then the first lever 46 will pivot, which disengages, or slides, the projecting surface 54 out of the niche 76. Thus, the second lever 70 will be free to pivot. This is the releasing position, and initiates release of the sinker 14 from the body 12.

Returning to FIG. 1, the sinker 14 is preferably a concrete or cement ball 80 with first and second hook members 82, 84, each outwardly extending from the ball 80 substantially the same distance as the other. It is desirable that the ball 80, which is releasably held by the body 12, have its mass distributed upon the body 12 through each of the hook members 82, 84. Such distribution aids in increasing the sensitivity of release initiation. This is a primary reason why each of the hook members 82,84 extends substantially the same distance as the other; also, either of the hook members 82,84 may be interchangeably utilized to releasably hold sinker 14 to body 12.

For convenient, balanced, releasable holding of the sinker 14 to the body 12, it is preferred that the first and second hook members 82,84 be spaced from each other to subtend an arc along the ball 80 of not greater than about 135°, more preferably to subtend an arc of from about 90° to about 45°, and further that the first and second hook members 82,84 be in a substantially parallel, outward relationship one to the other.

The above described parameters for the sinker 14 may be readily, precisely and inexpensively accomplished by having a hairpin-shaped member 85 encased inside the ball 80 with its prongs being the first and second hook members 82,84. Preferably, the first and second hook members 82,84 are formed as loops. The just described preferred formation for the sinker 14 is inexpensively manufactured, which is particularly important because the sinker 14 is routinely jettisoned and lost during use of the apparatus 10 unless, of course, the fisherman is unfortunate and has no significant strikes.

The apparatus 10 includes a mounting means 86 for pivotally mounting the sinker 14 on the body 12 and for permitting smooth continuous releasing of the sinker 14 from the body 12 in response to pivotal movement of the sinker 14 about the longitudinal axis 23 of body 12. The mounting means 86 includes a slot 88 located at the one end portion 24 of body 12. The slot 88 has its closed-off end inclined downwardly toward the lower surface 38 which co-operates with the second hook member 84.

Sinker 14 is mounted, or releasably held, on the body 12 by passing the second hook member 84 into the slot 88, and by inserting the first hook member 82 into the notch 34 (with the portion 44 holding the first hook member 82 in the notch 34 during the holding position of the release mechanism 22). The functioning provided by mounting means 86 will be more fully described hereinafter.

The notch 34 is preferably adapted to co-operate with the release mechanism portion 44 to hold the first hook member 82 within the notch 34. Such adaptation is whereby one side 90 of the notch 34 is cut back, or canted, so as to form an acute angle between itself and a notch bottom 94. The side 90 is that which is closer to the one end portion 24 than is another side 92 of notch 34. The side 90, or more particularly a corner 96 located thereat, will tend to have about half the mass of sinker 14 imposed, or wedged, thereagainst. The wedging tends to prevent inadvertent releasing of the sinker 14, as would tend to be the case were the first hook member 82 to be substantially entirely bearing upon the portion 44 of release mechanism 22. This wedging is aided by the water's resistance to the sinker 14 during trolling.

Turning to FIG. 2, functioning of the monitoring means 86 will now be more fully described. Assume a fish has taken the lure and has acutated apparatus 10 into its releasing position. As may now be understood, the release mechanism 22 is more sensitively actuated than would otherwise be the case because only part of the sinkers's mass is imposed upon the portion 44. Then, the portion 44 will pivot within the notch 34 and the first hook member 82 will begin to slide down the side 90 of notch 34. This pulls the second hook member 84 into a bottom 100 of the slot 88. The bottom 100 of slot 88 then defines a pivot point for the sinker 14. Since the sinker 14 is urged to continue to rotate, or pivot, about the longitudinal axis of body 12 toward the one end portion 24 as the trolling force is imposed on sinker through the fishing line 18, the sinker 14 is fully released when the fish is well hooked. The release of sinker 14 is completed when the second hook member 84 is swept out of the slot 88 by the water's drag. As a consequence, the fisherman senses the sinker'release.

As may now be understood, the end portion 24 of body 12 is permitted to be cocked downwardly in the water, since end portion 24 is spaced from both the fishing and leader line attachments to body 12. This cocking, or difference between longitudinal axis 23 and the fishing and leader lines 16,18 during the releasing position facilitates pivoting of the sinker 14.

Other aspects, objects, and advantages of this invention can be obtained from a study of the drawings, the disclosure and the appended claims.

I claim:

1. In an apparatus useful in fishing having a body and a sinker releasably held thereto, the body being attachable between a leader line and a fishing line, and having a release mechanism for the sinker which is actuated by the leader line between a releasing position and a holding position, an improvement comprising:

said body having a notch therein and said release mechanism being mounted on said body with a portion of said release mechanism being adapted for pivotal movement within said notch responsive to actuation of said release mechanism;

said sinker having a first hook member protruding therefrom, said first hook member being receivable within said notch and being held therewithin by said release mechanism portion during said holding position; and mounting means for pivotally mounting said sinker on said body and for permitting releasing of said sinker from said body responsive to pivoting of said sinker;

said release mechanism including a first pivotally mounted lever having said lead line swivelingly attachable to an arm thereof, a second pivotally mounted lever having said portion on an arm thereof and being closely adjacent said first lever, and biasing means for urging said first lever into engagement with said second lever to hold said second lever against pivotal movement within said notch.

2. The improvement as in claim 1 wherein said notch is adapted to co-operate with said release mechanism portion to wedge said first hook member against said notch during said holding position.

3. The improvement as in claim 1 wherein:

said mounting means includes portion of said body having a slot therein and a second hook member protruding from said sinker, said second hook member being receivable within said slot.

4. The improvement as in claim 3 wherein said body extends along a longitudinal axis said end portion being opposed to another end portion and wherein said leader line attachment, said notch and said relase mechanism are all positioned to be intermediate said end portions, and the fishing line swivelling attachment to said body is at said other end portion.

5. The improvement as in claim 1 wherein said second lever has a niche therein and said first lever has an outwardly projecting surface thereon, said projecting surface engaged with said niche to define the engagement of said first and second levers as urged by said biasing means.

6. The improvement as in claim 1 wherein said sinker is a concrete or cement ball having said first hook member and a second hook member each outwardly protruding substantially the same distance therefrom and being spaced from each other along said ball to subtend an arc of not more than about 135°.

7. The improvement as in claim 6 wherein said outwardly protruding hook members are substantially parallel one to the other and subtend an arc of from about 90° to about 45°.

8. The improvement as in claim 1 wherein said release mechanism includes a biasing means for holding said release mechanism portion against pivotal movement within said notch.

* * * * *

UNITED STATES PATENT AND TRADEMARK OFFICE
CERTIFICATE OF CORRECTION

PATENT NO. : 4,267,659
DATED : May 19, 1981
INVENTOR(S) : Roy Grasso

It is certified that error appears in the above—identified patent and that said Letters Patent is hereby corrected as shown below:

Column 3, line 11, "lver" should be "lever.

Column 3, line 12, "nnotch" should be "notch".

Column 5, claim 3, line 19, after "includes" and before "portion" insert --an end--.

Signed and Sealed this

Twenty-second Day of September 1981

[SEAL]

Attest:

GERALD J. MOSSINGHOFF

Attesting Officer

Commissioner of Patents and Trademarks